May 1, 1934.  R. R. SEARLES  1,957,002
AUTOMOBILE STEERING CONNECTION
Filed Aug. 5, 1931
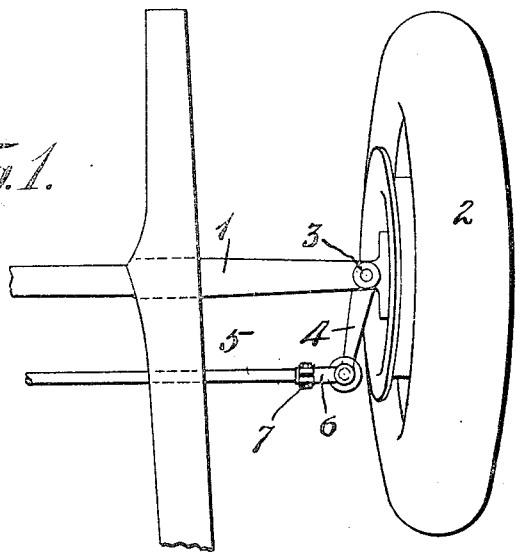
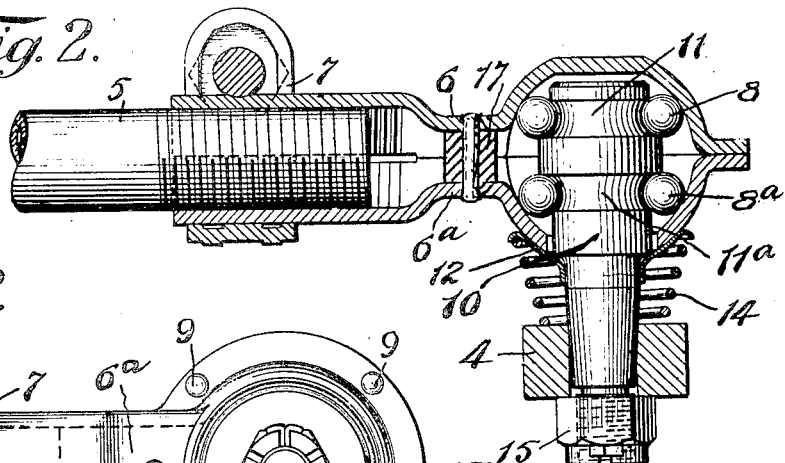
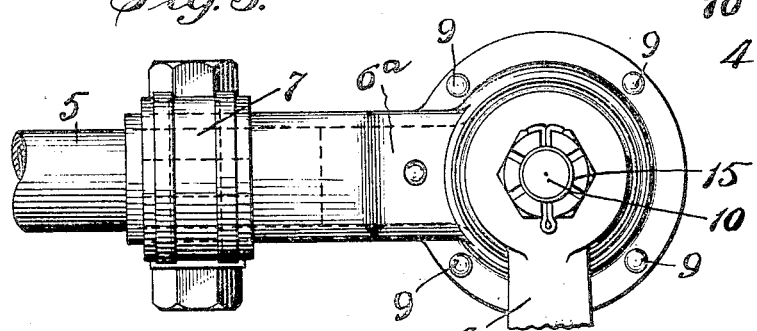
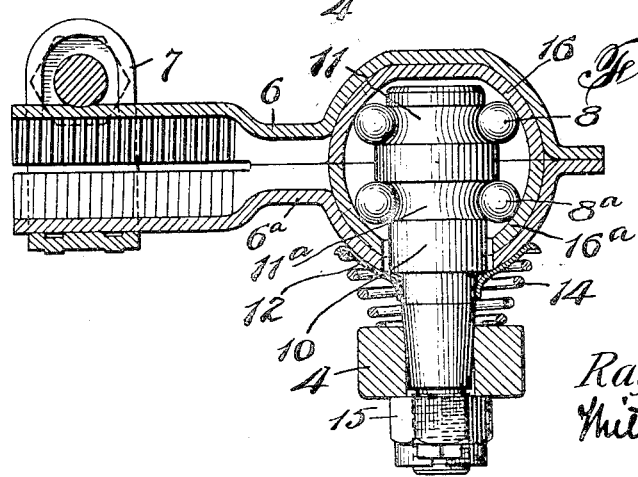
INVENTOR
Raymond R. Searles
BY
ATTORNEYS Patented May 1, 1934

1,957,002

UNITED STATES PATENT OFFICE 1,957,002

AUTOMOBILE STEERING CONNECTION

Raymond R. Searles, New Britain, Conn., assignor to The Fafnir Bearing Company, New Britain, Conn., a corporation of Connecticut Application August 5, 1931, Serial No. 555,269

4 Claims. (Cl. 287—90)

This invention relates to improvements in anti-friction devices and particularly to a construction which may be most advantageously applied to the steering mechanism of an automobile, wherein ease of operation and dependability are factors of the greatest importance. An object of the invention is to provide a means which requires very little lubrication, and then only on rare occasions after long usage. Another object is to provide a sturdy construction that may be quickly and economically made and assembled and that is self-aligning. These and other advantages will appear to the mechanic skilled in this art from a reading of the following description and an examination of the accompanying drawing in which I have shown my invention in certain preferred forms.

In said drawing—

Fig. 1 is a plan view of a portion of an automobile showing one of the steering wheels and a part of the steering mechanism therefor;

Fig. 2 is a relatively enlarged view partly in section;

Fig. 3 is a view of the under-side of the parts shown in Fig. 2;

Fig. 4 is a view similar to Fig. 2, showing a modification;

In the drawing, 1 represents one end of an axle upon the end of which are mounted the wheels, one of which is shown at 2. Each wheel is connected by means of the usual knuckle joint 3 to said axle. 4 is a steering arm rigidly connected to the steering knuckle of each wheel and by which the wheels may be turned on the axle in unison in the usual manner. The outer ends of the steering arms are connected by a tie rod 5. Inasmuch as the connection is the same for both ends of the tie rod, a description of one will suffice. As will be seen by reference to Fig. 2, there is what I may term a housing composed of two specially formed companion sheet metal parts 6—6a. These parts may be shaped by dies so that when secured together they will form at one end an internally threaded sleeve to receive the threaded end of the tie rod. 7 is a clamp by which, when the proper lengthwise adjustment of the tie rod has been effected in said sleeve, the two parts forming the sleeve for the tie rod may be clamped down rigidly upon the end of said rod 5 so as to firmly hold said parts in said adjusted relation. The edges of the sleeve are so formed, when stamped out and shaped, that there will be sufficient clearance, as shown in Figs. 1 and 4, to permit this clamping action to take place. The outer ends of the parts 6—6a are cupped to form when placed together a spherical chamber having two spherical internal surfaces upon which two series of anti-friction devices such as rollers or balls 8—8a may run. Outwardly extending flanges on the cupped outer ends of these pieces 6—6a permit said cupped portions to be firmly united by means of rivets 9—9. 10 represents a specially formed bearing stud, the head of which extends into the chamber formed at the outer end of the connection, said head having suitable races or ways 11—11a for the anti-friction devices 8—8a respectively. One side of the spherical housing has an opening to provide a clearance passage for the shank of the bearing stud 10, said cut away passage being sufficiently large to permit of limited oscillation of the head of the stud in the spherical chamber. 12 is a sheet metal cap which slidably fits on that part of the stud 10 just outside of the housing. This cap is dished or shaped to fit on the spherical outer wall of the housing around the passage for the stud 10. 14 is a spring which holds the cap 12 snugly in place so as to exclude dust from the outside, and so as to retain grease on the inside, of the housing. The outer end of the stud is preferably tapered and is drawn into a passage in the outer end of the steering arm 4 by means of a nut 15. The spring 14 may bear its outer end against the arm 4 which may function as an abutment therefor so that the thrust of the spring will be in a direction to hold the cap snugly in operative position against the spherical outer wall of the housing. From the foregoing, it will be seen that when the parts are assembled, the tie rod 5 will be connected to each arm 4 by means of an anti-friction bearing which gives perfect freedom of action, avoids squeaks, and withstands wear. If at any time it should be desired to add grease, the cap 12 may be pulled down against the tension of spring 14 and grease may be applied to the inside thereof, whereupon when the cap springs back into place, the grease will be forced through the opening around the stud 10 into the anti-friction bearing chamber and held therein.

In Fig. 4, the main construction corresponds to that already described in the preceding figures, but in this case I have provided two separate spherical ball races 16—16a which are seated in the ball chamber, and which may be gripped between the two parts thereof when these parts are assembled. Manifestly, the part 16a would have a stud passage corresponding to the stud passage through the part 6a.

In some cases it may be desirable to insert a spacer 17 between the side walls of the members 6—6a in the throat between the bearing chamber and the threaded sleeve. This spacer may be riveted in place, as shown, or otherwise held. This spacer also may perform the function of a fillet to separate the bearing chamber from the sleeve portion to prevent lubricant from escaping from the former into the sleeve gripping portion.

It will be understood that I have shown the invention in a preferred form and that various changes and modifications can be made without departing from the spirit and scope thereof.

I claim:

1. In a device of the character indicated, a pair of sheet metal stampings each having a cup at one end and a half socket at the other, each cup portion having a marginal flange thereon, means for securing said marginal flanges together, and a filler block between the half socket portions adjacent the cups to form a substantially enclosed space with said cups, a stud extending through one of said cups and into said space, and anti-friction bearing members interposed between said stud and cups.

2. In a steering connection for motor vehicles, a pair of complementary sheet metal stampings, each being provided at one end with an internally threaded channeled portion and at its opposite end with a cupped portion providing a spherical bearing surface, an integral outwardly extending flange around the edge of each cupped portion, with means for permanently securing the stampings together at their cupped ends only.

3. In a steering connection for motor vehicles, a pair of complementary sheet metal stampings, each being provided at one end with an elongated, internally threaded, channeled portion, said internally threaded, channeled portions being complementary to each other to form a threaded bore for the reception of a threaded rod, said sheet metal stampings being provided at their opposite ends with raceway sockets, one of said sockets having an aperture for the passage of a stud, a stud extending through said aperture, said stud having a pair of circumferentially extending spaced apart raceways for balls, each said raceway being complementary to one only of said socket portions, bearing balls between said raceway sockets and said raceways on said stud, each said socket portion having an outwardly extending integral flange around the edge thereof, and means for permanently securing said flanges to each other.

4. In a device of the character indicated, a pair of sheet metal stampings, each having a socket therein, said sockets being complementary to each other to form a housing, means for permanently securing said stampings together peripherally of said sockets, one of said sockets having an aperture therein for the passage of a bearing stud, a bearing stud extending into said housing, a pair of complementary race cups, one seated in each of said sockets and forming together a pair of complementary, substantially spherical, raceways for anti-friction bearing members, said bearing stud having a pair of spaced apart raceways, and anti-friction bearing members interposed between the raceways on said stud and the raceways in said raceway cups, the anti-friction bearing members on one said raceway of said stud coacting with one of said raceway cups, and the anti-friction bearing members on the other raceway of said stud coacting with the raceway of said other raceway cup, said socket portions holding said raceway cups in permanently adjusted position relatively to said anti-friction bearing members and said stud.

RAYMOND R. SEARLES.